United States Patent [19]
Bibeault

[11] Patent Number: 5,845,377
[45] Date of Patent: Dec. 8, 1998

[54] SELF ACTUATING MECHANICAL JOINTS

[76] Inventor: Mark L. Bibeault, 2889 A Nickel, Los Alamos, N. Mex. 87544

[21] Appl. No.: 801,291

[22] Filed: Feb. 18, 1997

[51] Int. Cl.$^6$ .................................................. A44B 21/00
[52] U.S. Cl. .................................. 24/634; 24/608; 24/645
[58] Field of Search ............................ 24/634, 633, 632, 24/631, 635, 606, 603, 645

[56] References Cited

U.S. PATENT DOCUMENTS

| | | | |
|---|---|---|---|
| 943,127 | 12/1909 | Boven . | |
| 1,252,776 | 1/1918 | Camper | 70/102 |
| 2,118,729 | 5/1938 | Hogan | 292/27 |
| 2,448,817 | 9/1948 | McArthur | 287/20.5 |
| 3,146,846 | 9/1964 | Gutshall | 24/634 |
| 3,253,310 | 5/1966 | McCarthy | 24/230 |
| 3,280,439 | 10/1966 | McCarthy | 24/211 |
| 3,300,171 | 1/1967 | Watts | 24/608 |
| 3,311,188 | 3/1967 | Gutshall | 24/635 |
| 3,362,050 | 1/1968 | McCarthy | 24/230 |
| 3,413,692 | 12/1968 | Pressley | 24/634 |
| 3,469,872 | 9/1969 | Damm et al. | 287/119 |
| 3,561,802 | 2/1971 | Brockway | 292/49 |
| 3,801,051 | 4/1974 | Hosterman et al. | 244/137 R |
| 4,587,695 | 5/1986 | Jensen | 24/634 |
| 4,711,003 | 12/1987 | Gelula | 24/645 |
| 4,836,707 | 6/1989 | Myers | 403/322 |
| 5,188,381 | 2/1993 | Xho | 280/37 |

FOREIGN PATENT DOCUMENTS

| | | | |
|---|---|---|---|
| 0557868 | 8/1923 | France | 24/634 |

OTHER PUBLICATIONS

Chironis & 1996 Mechanisms & Sclater Mechanical Sourcebook, 2nd ed. pp. 163, 165 (no month date is given).

*Primary Examiner*—Victor N. Sakran

[57] ABSTRACT

Self actuating mechanical joints that utilize pivotally mounted clamping levers (114) linked to a displaceable catch (112). The displaceable catch engages an external beam (126) inserted into the joint and thus initiates the clamping levers to clasp around the beams profile. Mechanical integrity between beam and joint is achieved when the displaceable catch locks with a stationary catch (102) at the instance the beam is fully inserted into the joint. The three joint designs presented in this patent are the Lever Latch (99), Lever Clamp (299), and Trunnion Clamp (499). Together, they allow mechanical parts to be joined under the following respective circumstances: beam element connected to beam element along their centerline axis, one beam element connected perpendicular to another beam elements centerline axis, and flat plat connected to another flat plat. These mechanical joints may be designed into basic structural building members that are utilized to assemble a structure, disassemble this structure at a later time, and then re-assembled into an entirely new structure. Assembly may occur at a remote location, within a physically confined space, or under adverse environmental conditions. The family of mechanical joints are versatile and provide the user with a variety of assembly options on site.

5 Claims, 22 Drawing Sheets

SELF ACTUATING MECHANICAL JOINTS

BACKGROUND

1. Field of the Invention

The present invention is generally related to mechanical joints, specifically to self actuating mechanical joints that utilize pivotally mounted clamping levers linked to a displaceable catch.

2. Review of Prior Art

Mechanical or structural joints come in a variety of shapes and sizes and are used to assemble many types of structures. In general, these joints include brackets, braces, and couplings. Welds, nuts and bolts, nails, clamps, and various forms of pegs provide the mechanical integrity for a structural joint. A few mechanical joints utilize a form of pivotally mounted clamping or locking lever to help provide the necessary joining integrity. The prior art associated with such devices is well developed but suffer from a number of disadvantages.

U.S. Pat. No. 1,252,776 to Camper, Jan. 8, 1918, describes an automatic catch or lock to connect with stud protrusions. Campers lock utilizes a casing, appositely placed cooperating jaws, springs arranged to contact both the casing and jaws for normally urging the jaws toward each other, a locking bar having depending flanges to engage the longitudinal sides of the jaws, a pinion connected to the locking bar to rotate the bar about its axis for removal, and a bar journaled through the locking jaws to provide a permanently locked assembly.

Campers lock suffers from a number of disadvantages. First, Campers lock only connects to stud protrusions that posses a pinion gear or similar rotating device. Secondly, Campers lock does not find practical applications to connect a flat surface to flat surface, or a beam to a flat surface. Thirdly, Campers lock is clumsy and inefficient to operate. Finally, Campers locking beam is only temporarily held in place by the force of the spring arrangement. A bar journaled though the locking jaws must be inserted in a separate step by the user to provide a permanently locked assembly.

U.S. Pat. No. 2,448,817 to McArthur, Sep. 7, 1948, describes a fastening device for detachably connecting one article to another without the use of tools. McArthurs fastener is designed for fastening to extended notches from flat surfaces and not useful to connect a flat surface to another flat surface. McArthurs fastener also requires a large volume to operate. This makes McArthurs fastener more suited for specialized applications and not generic uses. Finally, McArthurs fastener is only a temporary fastener and not useful to form a permanent joint.

U.S. Pat. No. 3,253,310(1966), U.S. Pat. No. 3,280,439 (1966), and U.S. Pat. No. 3,362,050 (1968), all to McCarthy, describe correspondingly a mechanical coupling, a releasable two-part fastener, and a concentric tube releasable clasp. No form of levers are utilized in any of McCarthys patents. All three inventions operate in a similar manner. A transverse locking stud enters a recessed region by pushing aside a spring loaded cylindrical locking member. Because of the complex configuration of components, McMarthy's patents are only suitable for specialized applications as they are not adaptable to a variety of generic applications. In particular, they are not useful to connect a flat surface to another flat surface.

U.S. Pat. No. 3,469,872 to Damm et al, Sep. 30, 1969, describes a load-releasing lock-on coupling device. Damm's coupling device consists of a reciprocating plunger with arranged projections defining recesses. These recesses receive sliding sprag elements to lock the plunger in conjunction with an inserted lock-on stud in place. Damm's invention also possesses a sear plat with cam surfaces for moving the plunger to permit releasing of the lock-on stud.

Damm's coupling device consists of many small, complex parts. This makes the coupling suitable only for specialized applications and expensive to manufacture. Further, the many small components form a system that takes a large volume to operate. Additionally, Damm's coupling is not a self contained device since the sear plat must function with external components outside of the coupling. Damm's couple is not useful to connect structural members to form a permanent structure. Damm's coupling device is also not useful to connect a flat surface to another flat surface.

U.S. Pat. No. 3,561,802 to Brockway, Feb. 9, 1971, describes a latch having opposed and pivotally mounted keeper jaws for engagement with a latch bolt thrust in between the jaws. The jaws are attached to a sliding plate, which is locked in place by a cam assembly. The sliding plate does not lock itself in place.

Brockways use of cam to lock a latch results in a number of disadvantages. First, the latch is not compact in volume due to the inclusion of the cam assembly components. Secondly, the extra volume makes the latch impractical to apply as a direct flat plat to flat plat connector or other generic applications to assembly permanent structures. Thirdly, the lock is not a self contained operating device since the cam components of the lock must be integrated with system components outside the lock.

Further disadvantages of Brockways invention results from connecting the locking jaws directly to the slider plate. This type of configuration allows for only small latch bolts to be inserted between the jaws. Sufficient rotation of the jaws to clamp around larger objects can not be accomplished without the jaws themselves being large. Brockways latch also can not connect to latch bolts more common shape cross sections such as circles, squares, or rectangles. Finally, Brockways latch is not useful to support bending moments in beam elements since the inserted bolt does not engage the housing unit.

U.S. Pat. No. 4,836,707 to Myers, Jun. 6, 1989, describes a releasable clamping apparatus which is adjustable to accommodate differently sized lifting handles mounted on components to be lifted into space by devices such as the Remote Manipulator Arm of the Space Shuttle. Myers clamp consists of a housing unit with slot opening, retaining members extended into an opening, clamp assembly responsive to a cam, and an external lever arm.

There are several disadvantages associated with Myers clamp. First, Myers clamp is only useful to hold components in the grasp of a generic lifting arm for a short time period. This clamp is not useful to assemble components into full, permanent structures. Secondly, Myers clamp does not allow a flat surface to connect to another flat surface. Thirdly, operation of Myers clamp is a two step process since the insertion of the handle does not self engage the clamp to lock the handle in place. Finally, Myers clamp consists of a complex configuration of components which makes it expensive to manufacture.

U.S. Pat. No. 5,188,381 to Kho, Feb. 23, 1993, describes a wheel holding bracket assembly for a suitcase. Kho's bracket assembly consists of a bracket, and a lever pivotally mounted on the bracket with receiving slots to receive a rod. While this device is self locking and useful to clamp along the length of cylindrical beams, it is not useful to support beam elements as in a socket joint or connect a flat surface to another flat surface to form a permanent structure.

U.S. Pat. No. 4,587,695 to Jensen, May 13, 1986, describes a snap-in latch mounting bracket. Jensen's bracket assembly consists of two lever arms with latch hooks mounted opposite each other inside the cavity of a housing. A resistance compression spring connects both levers together so they resist receiving insertion of an external element. Jensen's invention is not useful to support beam elements or connect a flat surface to another flat surface to form a permanent structure. Furthermore, the restraining strength of the bracket is determined by the spring, and thus not useful towards assembly of two or more elements into one solid structure.

U.S. Pat. No. 3,413,692 to Pressley, Dec. 3, 1968, describes a fastener with a predetermined load release. Pressely's fastener consists of an elongated housing unit with a central cavity. The housing supports chuck-type jaws which retract and grip an enlarged cable end attached to a cable when the cable end is inserted into a side opening of the housing. An assembly of springs provides a predetermined load release capability. Pressely's invention is complex, not lending itself towards multiple applications and making it expensive to manufacture. Furthermore, the fastener is not useful to support beam elements or connect a flat surface to another flat surface to form one solid structure.

Despite having a well developed prior art, all these heretofore known connection devices suffer from the following disadvantages:

(a) They require the use of external tools or elaborate assembly procedures to provide the ultimate locking action. These tools include pliers, hammers, or wrenches. This requires that the tools be carried along with the user to the utilization site. If the location is remote and only accessible over rough terrain, the extra mass and volume transported could better be used for scientific or survival hardware.

(b) They are designed for a specific single operation and are not easily adaptable from one application to another. This includes interfacing with support members of only specific geometry.

(c) Several steps are required to perform the locking action. At remote locations severe environmental conditions may inhibit the assembly of structures. Also, these steps inhibit the connection devices from being utilized in several generic applications.

(d) Several steps are required to perform the disconnect action. This feature limits generic utilization in structural support members, and prohibits a structure from being disassembled and rebuilt at another location. The time and energy spent disassembling structures can also be spent planing the next mission objectives.

(e) Reliability is achieved with a large number of components, complex configuration of components, and complex methods of manufacture.

(f) Adjustments by the user are necessary to perform the locking action. This may include a twisting action of a locking beam element or rotation of a cam assembly.

(g) Parts must be precisely aligned in order for locking action to occur, requiring the user to spend time and energy performing the alignment.

(h) Locking action is accomplished by components encompassing a large volume. This feature limits practical generic applications. The extra volume associated with the structural components also means less overall hardware may be transported to remote locations for a given transport vehicle.

(i) Locking device is not a self contained entity, requiring integration with system components. This feature limits practical generic applications.

(j) Automated assembly and remote handling is not possible or practical due to the complex configuration of components and clumsy operation.

(k) Not applicable towards assembly of a final structure. The intended use is to hold elements in place for a short time.

(l) Support load capability is limited to shear, tension and compression stress conditions. Bending moment support is negligible.

OBJECTS AND ADVANTAGES

The process of constructing a structure, such as a building, may be broken into two main parts. First, there is the design of the structure itself. This design brings form and function concepts into a pictorial existence that can be visualized. This activity is typically performed by engineers and/or architects. Second, the structure is built using the design supplied from the engineers. Building a structure is a combination of many practical skills including procurement, scheduling, and physical labor.

Construction requires a lot of planning between many different individuals. Under normal circumstances, the time to build a structure and mass of material used is of no concern to the builder. However, when building structures at remote sites, within physically confined areas, or under adverse environmental conditions, assembly techniques that account for time and mass do become important. Examples include a remote platform erected at the bottom of the ocean or in low earth orbit to hold experiments, a base camp built in Antarctica to protect engineers and scientists from the cold, or an emergency shelter erected at a disaster area to set up shelters, mini hospitals, or logistic centers.

Under the circumstances cited above, the ability to quickly assembly and disassemble a set of structural elements can mean either the ability to perform an operation or not at all. In space applications this is particularly true. Space missions to date have concentrated on single, one-shot missions. The result has been either performing a scaled down mission or no mission at all.

My invention is a family of structural support members or mechanical joints that can quickly connect, support, and disengage various building-block elements. They may be utilized in many different applications to assembly structures at remote locations, within physically confined areas, or in adverse environments. To provide the mechanical integrity between members, they all utilize a pair of pivotally mounted clamping levers linked to a displaceable catch.

The name of each invention is related to the intended function of each joint. The first support is named lever latch with an intended use of joining beam elements to beam elements along their centerline axis. The second support is named lever clamp with an intended use of joining beam elements to beam elements perpendicular to the beams centerline axis. The third support is named trunnion clamp with an intended use to join a flat surface element to another flat surface element.

There are a number of joint designs possible. A joint assembly may consist of a single joint using one type of connection. Likewise, a joint assembly may consist of multiple joints using one type of connection or a mix of connections. These support members may be designed into basic structural building members that are utilized to assemble a structure, disassemble this structure at a later time, and then re-assembled into an entirely new structure.

Accordingly, the full set of objects and advantages for my invention are:

(a) to provide a one step joining action. Mating an external member with the joint produces a single rigid structure. Conversely, to provide a one step disconnect action.

(b) to provide adaptation for use in many configurations. These configurations include mechanical joints to unit the following: beam member to beam member along a collinear axis, beam member to beam member along a perpendicular axis, plane surface to plan surface, plane surface to beam along the beams collinear axis, and plane surface to beam perpendicular to the beam axis.

(c) to provide a self actuating locking action. The act of mating two separate pieces causes the two pieces to become mechanically joined quickly and efficiently. No external tools are needed for joining to occur.

(d) to provide the ability to assemble a structure, disassemble this structure at a later time, and then to re-assemble an entirely new structure. The assembly may occur at remote locations, within physically confined areas, or under extreme environmental conditions. This ability will give the user more control to match mission objectives with available resources.

(e) to reduce the mass and volume required to assembly a structure.

(f) to provide a simple operation as determined by the number and configuration of components.

(g) to require no user adjustments or alignments of components needed to perform the locking or unlocking action.

(h) to reduce the physical volume of the mechanical joint assembly.

(i) to provide a self contained joint entity, requiring no integration with system components other than structural integrity of the joint itself.

(j) to make automated assembly and remote handling practical at remote locations or within physically confined areas, or under adverse environmental conditions.

(k) to simultaneously support shear, tension, compression, and bending moment loading conditions.

Further objects and advantages are to provide joining devices which can be used easily and conveniently to connect objects to one another, which are inexpensive to manufacture, which can be used repeatedly, and which reduces the time the user must spend erecting structures or joining objects to one another. Still further objects and advantages will become apparent from a consideration of the ensuing description and drawings.

DRAWING FIGURES

In the drawings, closely related components have the same number but different alphabetic suffices.

Figure 8:
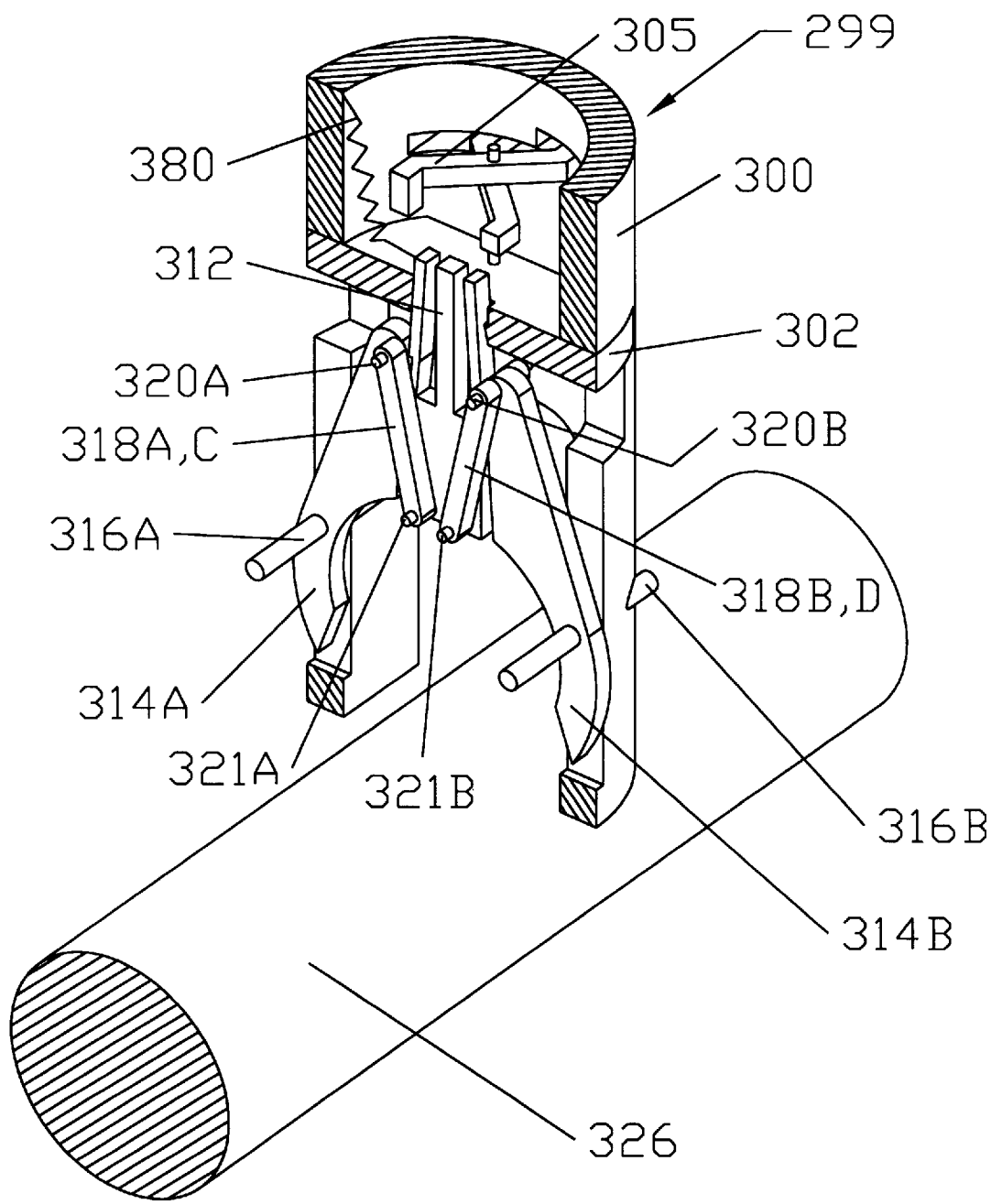

FIG. 8 isometric cutaway view of the lever clamp invention in the unlocked position showing the internal configuration of components.

Figure 9:
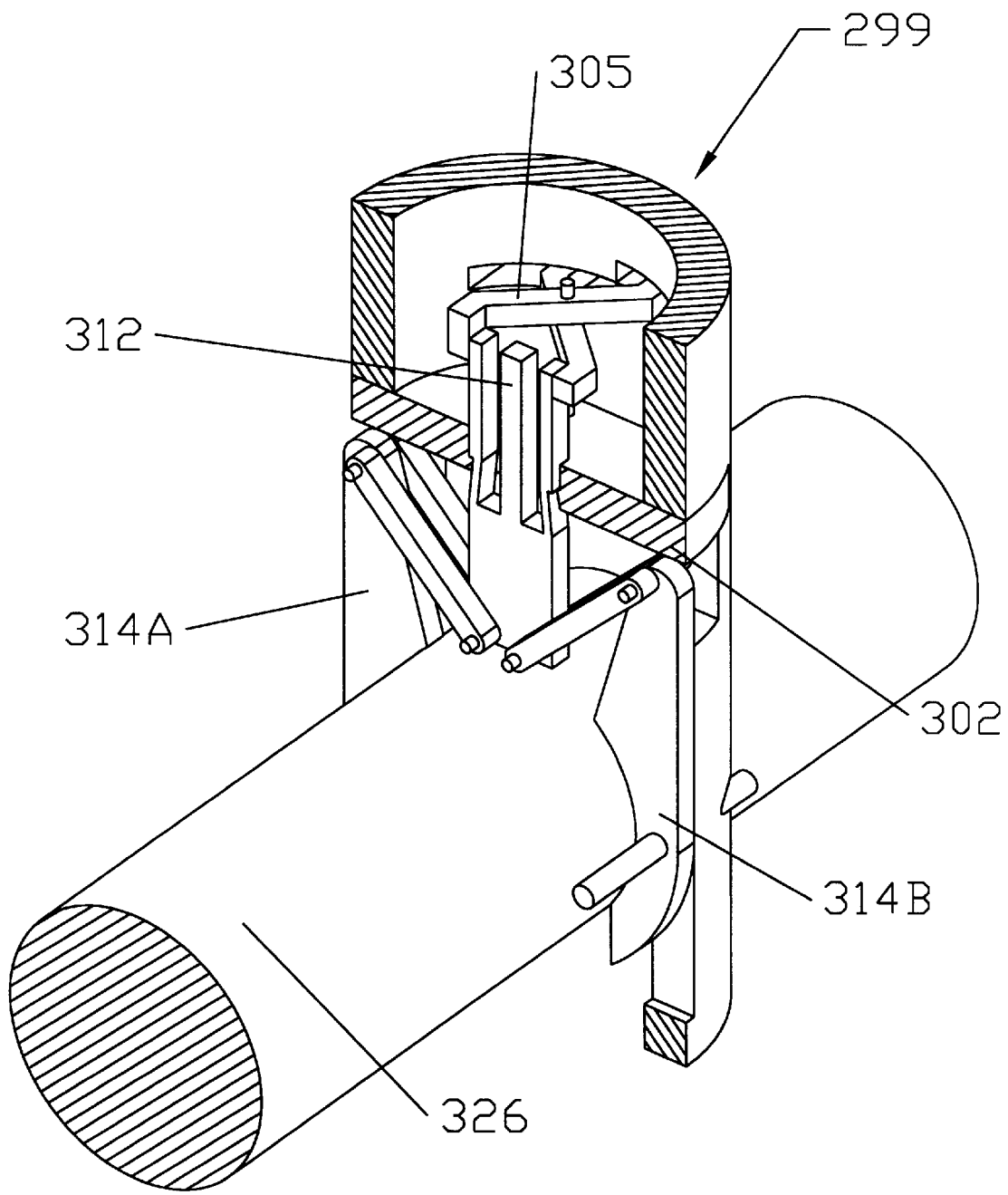
Figure 10E:
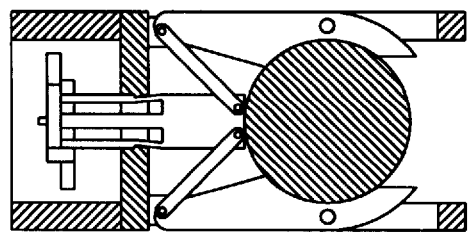
Figure 10D:
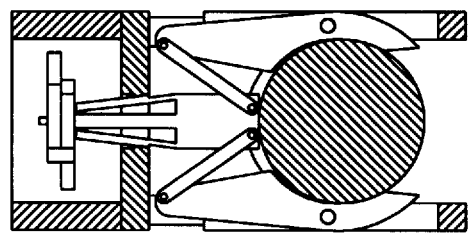
Figure 10C:
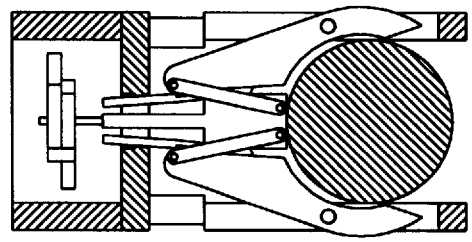
Figure 10B:
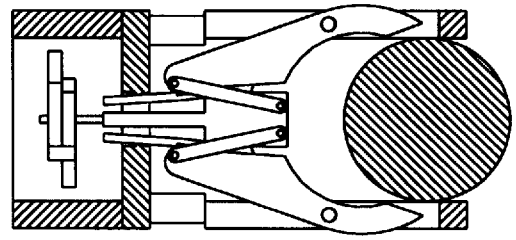
Figure 10A:
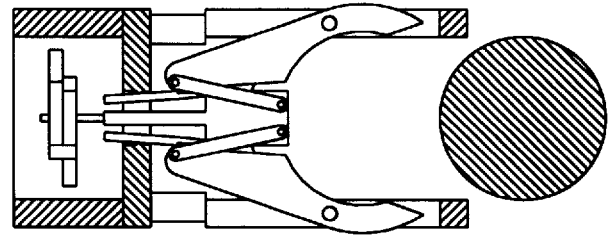

FIG. 9 shows an isometric cutaway view of the lever clamp invention in the locked position with external beam fully inserted into the housing unit.

FIGS. 10A–10E show a series of lever clamp plan views portraying the joints locking sequence.

Figure 11:
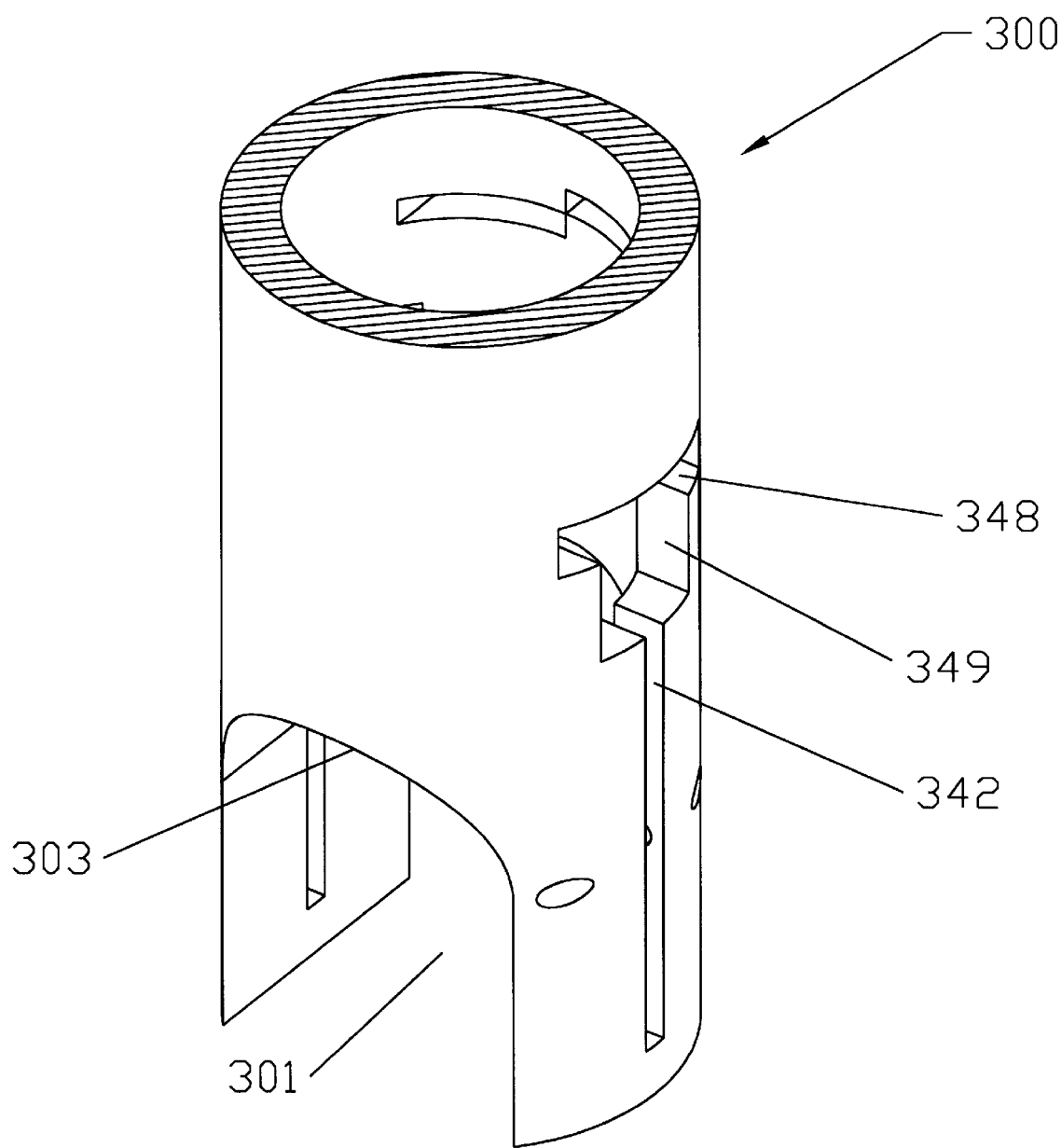

FIG. 11 shows a separate isometric view of the lever clamp housing unit.

Figure 12:
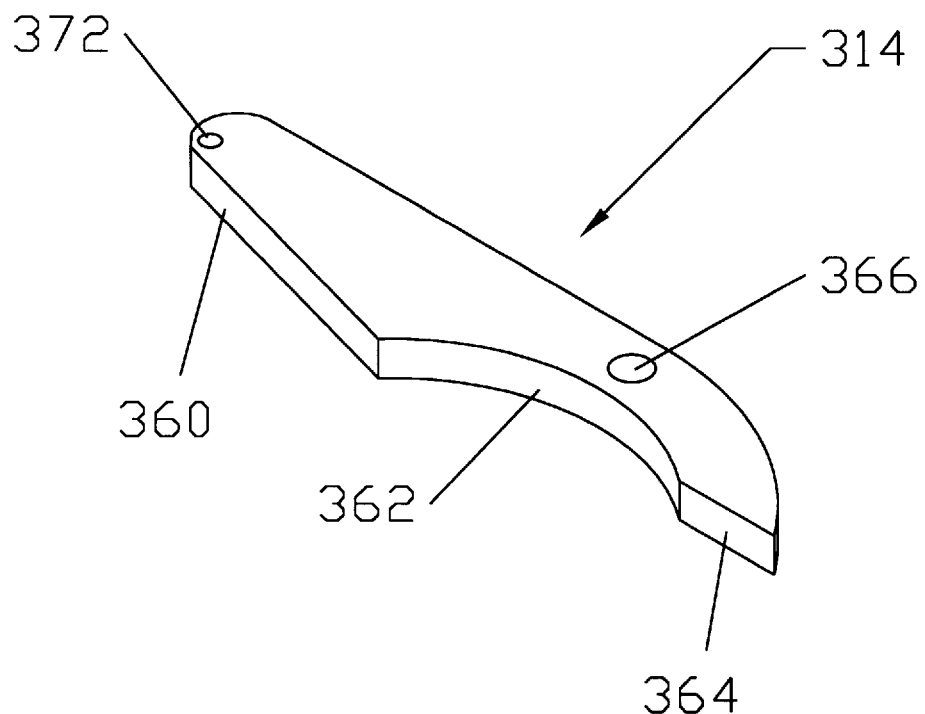

FIG. 12 shows a separate isometric view of the clamping lever associated with the clamp.

Figure 13:
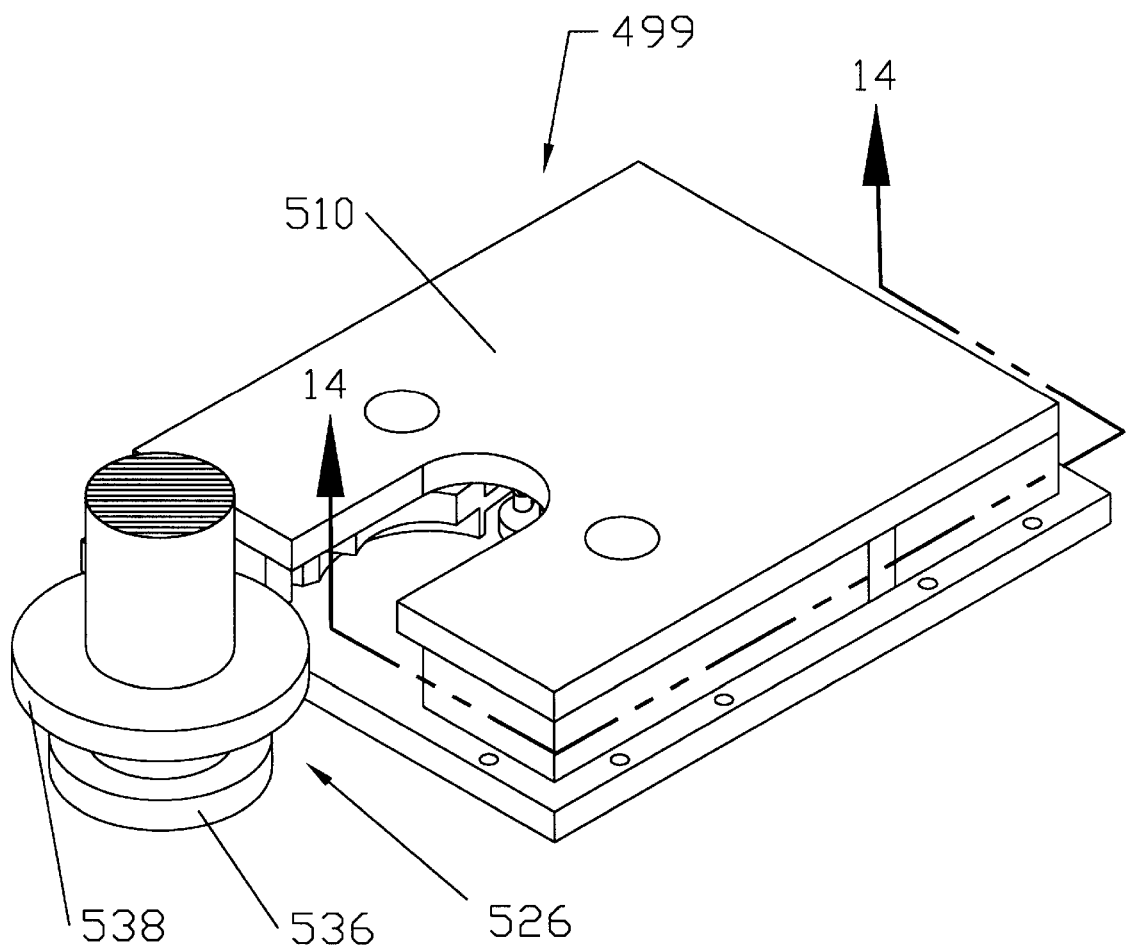

FIG. 13 shows a full isometric view of the trunnion clamp invention in the unlocked position.

Figure 14:
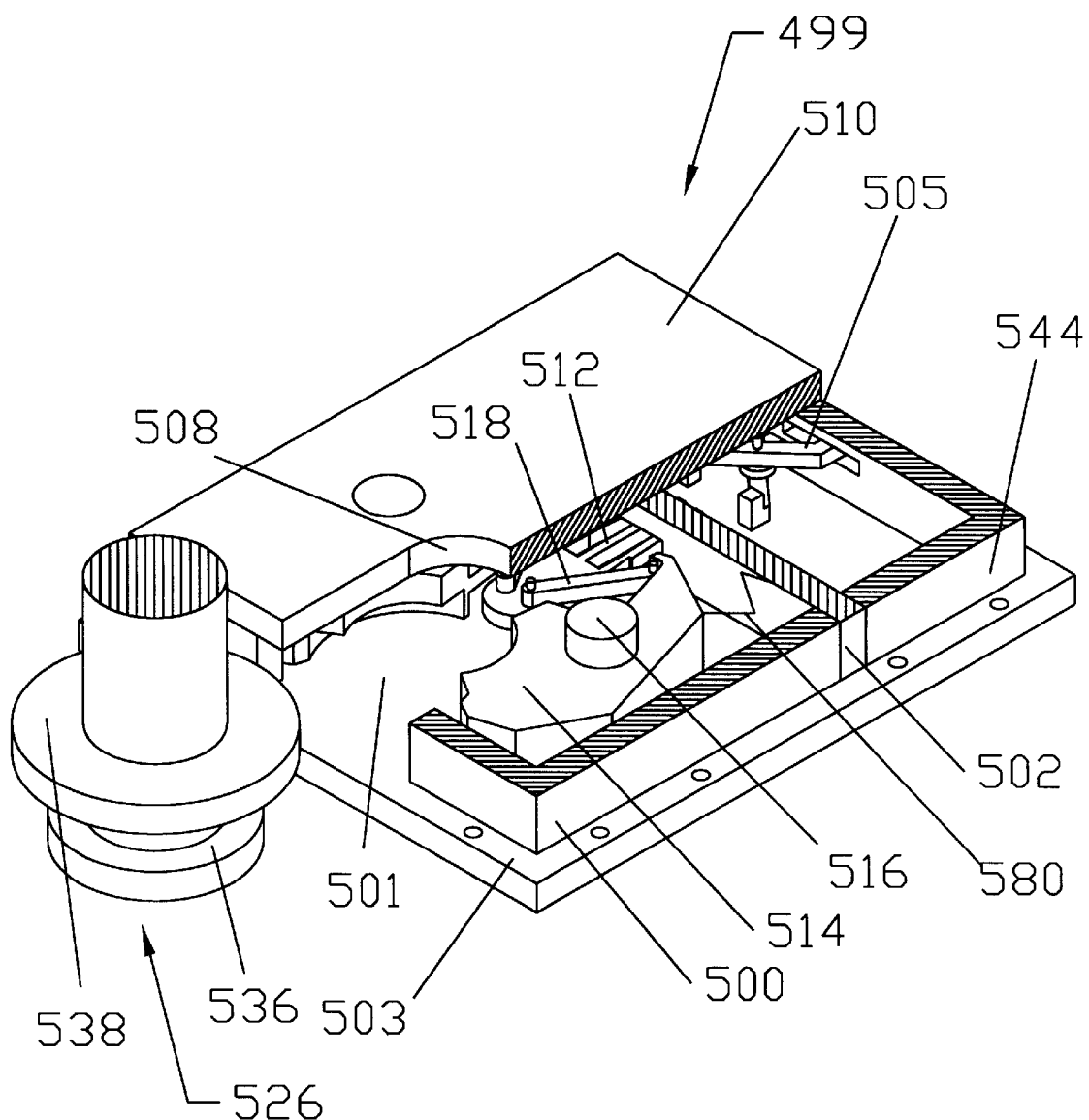

FIG. 14 is an isometric cutaway view of the trunnion clamp invention in the unlocked position showing the internal configuration of components.

Figure 15:
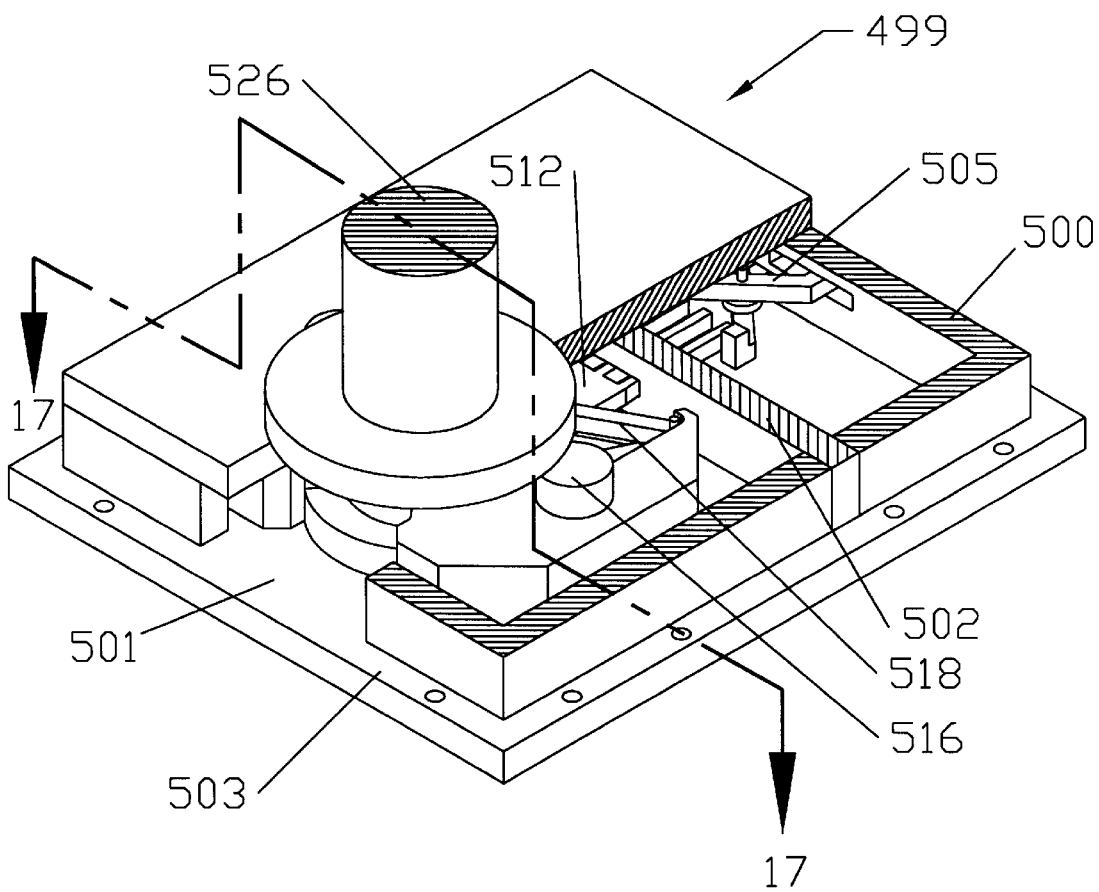
Figure 16E:
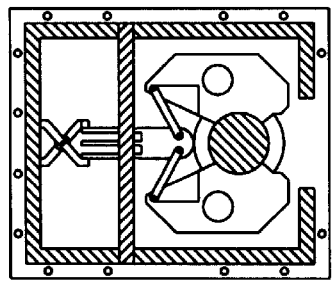
Figure 16D:
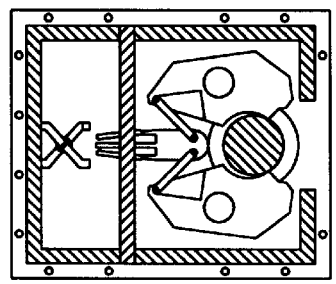
Figure 16C:
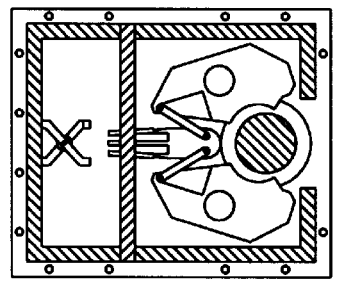
Figure 16B:
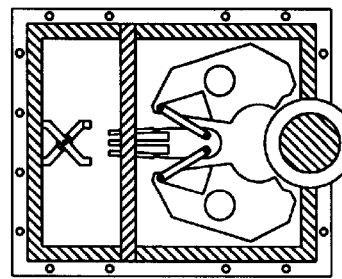
Figure 16A:
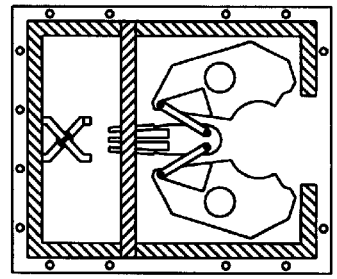
Figure 16A:

FIG. 15 shows an isometric cutaway view of the trunnion clamp invention in the locked position with external beam fully inserted into the housing unit.

FIGS. 16A–16E show a series of trunnion clamp plan views portraying the joints locking sequence.

Figure 17:
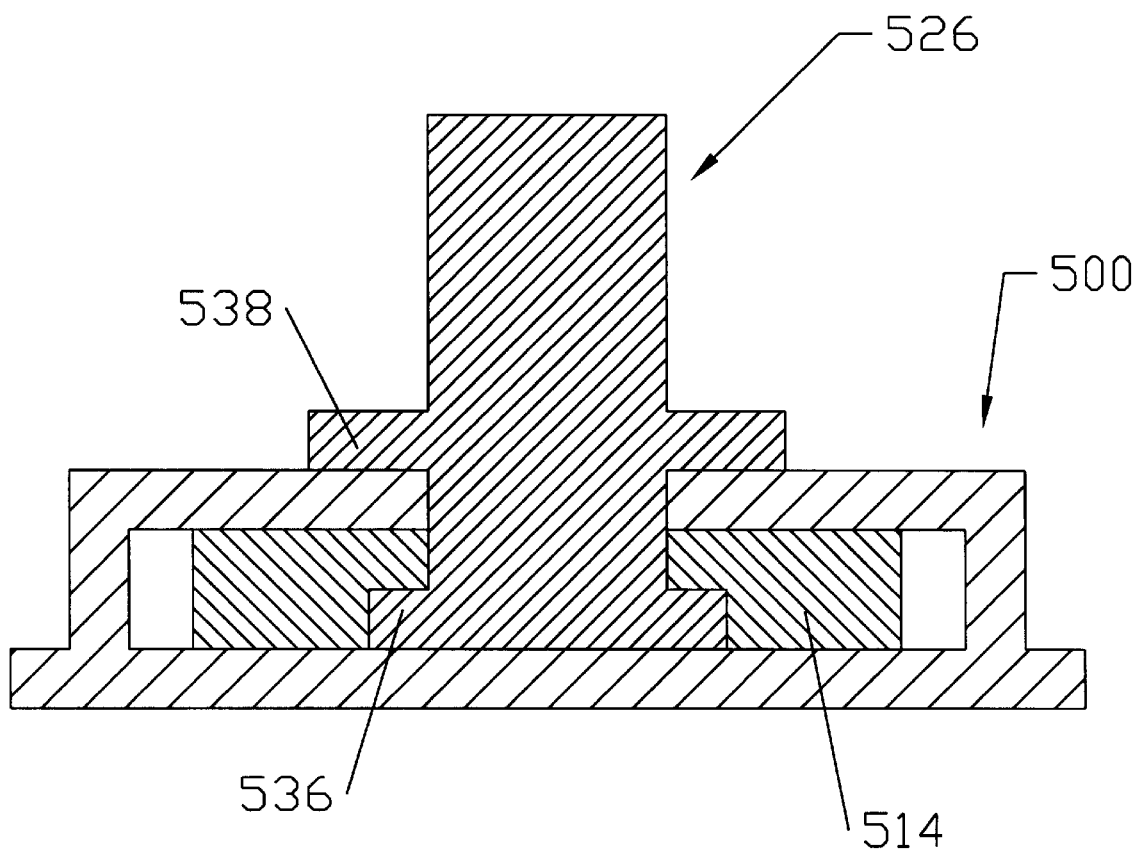

FIG. 17 shows a cross sectional plan view of the trunnion clamp assembly.

Figure 18:
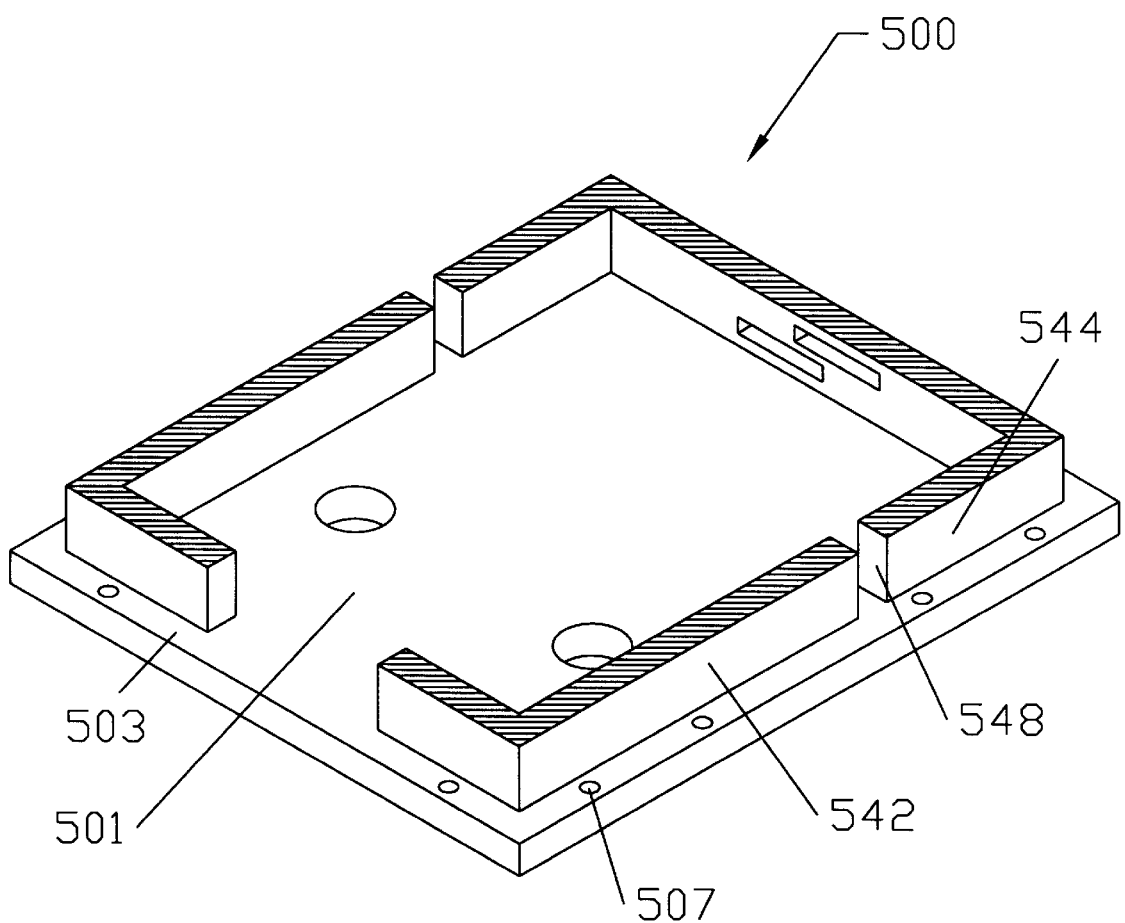

FIG. 18 shows a separate isometric view of the trunnion clamp housing unit.

Figure 19:
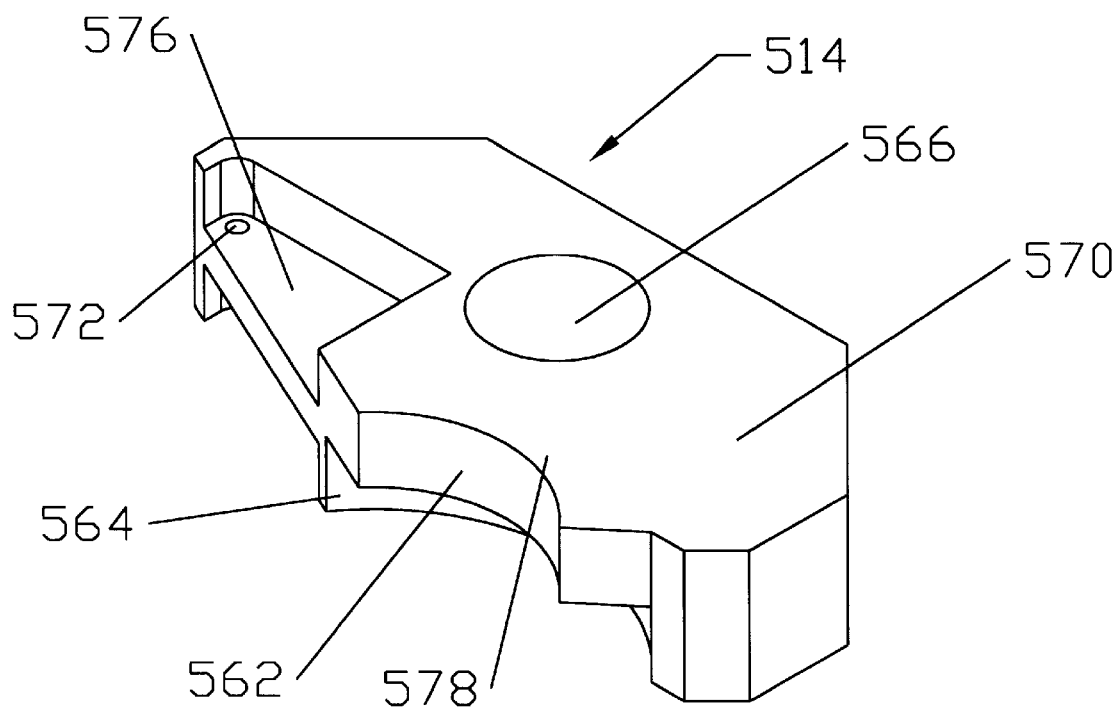

FIG. 19 shows a separate isometric view of the clamping lever associated with the trunnion clamp.

Figure 20:
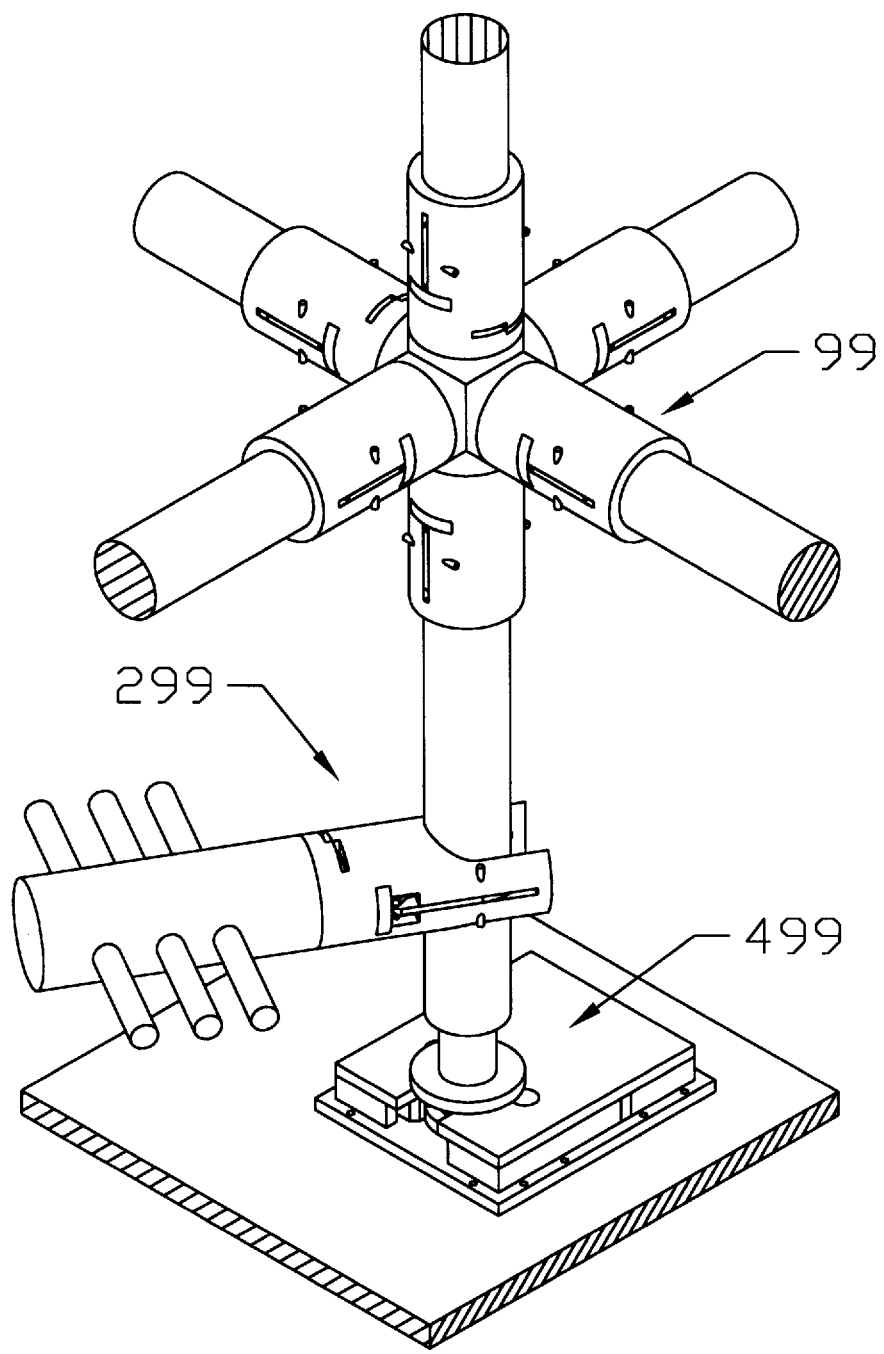

FIG. 20 shows a schematic isometric view of the lever latch, lever clamp, and trunnion clamp inventions being utilized supporting structures and equipment.

Figure 21:
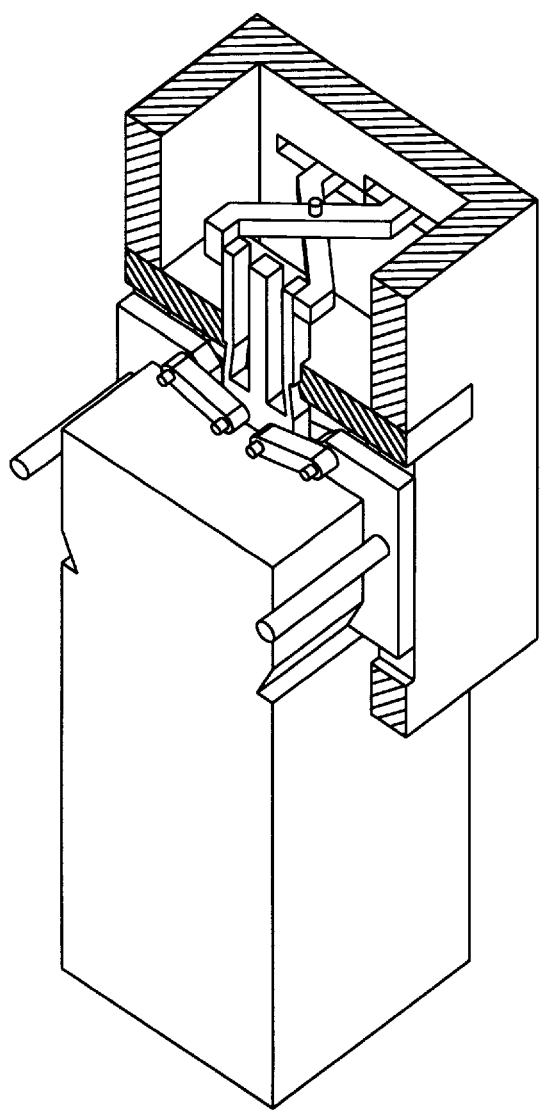

FIG. 21 is a full isometric view of the lever latch invention in the unlocked position with a rectangular cross section design.

Figure 22:
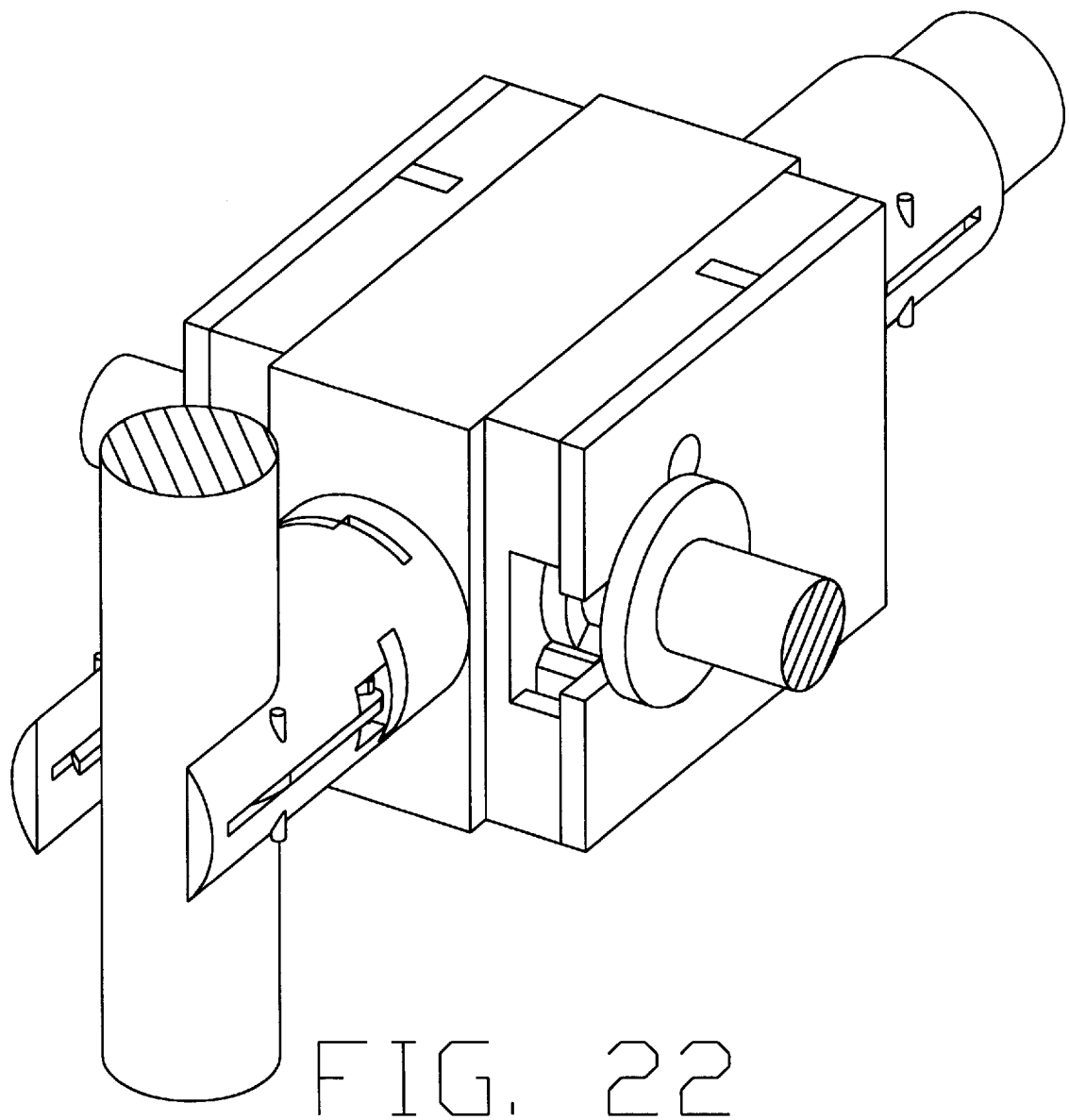

FIG. 22 shows a schematic isometric view of a multiple joint design using the lever latch, lever clamp, and trunnion clamp inventions.

REFERENCE NUMERALS IN DRAWINGS

Different numerals may be assigned an identical description since the three different structural support members presented in this patent posses similar functioning components. In general, numerals 99 to 199 reference lever latch components, numerals 299 to 399 reference clamp components, and numerals 499 to 599 reference trunnion clamp components.

99 Lever Latch Invention
100 housing member
101 housing member bore hole
102 stationary catch
105 release assembly
112 displaceable catch, also referred to as a diaphragm
114 clamping lever
116 lever support
118 link 120 link connection
121 link connection
122 circumference that forms housing member bore hole
126 external beam assembly
128 front surface of external beam
130 locking notch
131 Inclined surface forming locking notch
132 clasping surface on external beam
134 external beam main element
144 clamping lever cavity
148 stationary catch cavity
160 inclined flat surface that forms protrusion 178
162 side surface on clamping lever
164 base surface on clamping lever
166 lever support hole
170 base section of clamping lever
172 link support hole
174 axially section of clamping lever
178 triangular protrusion of clamping lever
180 spring
299 Lever Clamp Invention
300 housing member
301 housing member bore hole
302 stationary catch
303 recess cut into housing member wall
305 release assembly
312 displaceable catch, referred to as a diaphragm
314 clamping levers
316 clamping lever support
318 link
320 link connection
321 link connection
326 external beam assembly
344 clamping lever cavity
348 stationary catch cavity
349 link cavity
360 inclined flat surface on side of clamping lever
362 curved surface on clamping lever used for clamping
364 axially surface on clamping lever
366 lever support hole
372 link support hole
380 spring
499 Trunnion Clamp Invention
500 housing member
501 bore hole for inserting trunnion
502 stationary catch
503 base plate of housing member
505 release assembly
507 bolts to connect trunnion clamp to a solid surface
508 notch cut from top plate matching profile of external beam
510 coverplate
512 displaceable catch, also referred to as a diaphragm
514 clamping levers
516 clamping lever supports
518 links
526 trunnion
536 flat pancake style disk located at end of external beam
539 flat pancake style disk offset from end of external beam
542 housing side wall
544 housing side wall
548 stationary catch cavity
562 upper curved surface on clamping levers that abuts against trunnion profile
564 lower curved surface on clamping levers that abuts against trunnion profile
566 lever support hole
570 clamping lever main body
572 link support hole
576 recessed cavities within clamping levers
578 extended arcing tab that forms a rectangular stepped cross section used for clamping
580 spring Introduction to Invention Descriptions The main embodiment of my invention is a family of structural support members or mechanical joints that utilize a pair of pivotally mounted clasping levers aligned along a common axis and linked to a displaceable catch. There are three distinct members to this family; a lever latch 99, a lever clamp 299, and a trunnion clamp 499 as shown respectively in FIG. 20. The following sections describe the physical features and explain how each latch or clamp operates.

Description of Lever Latch—FIGS. 1 to 8

Figure 1:
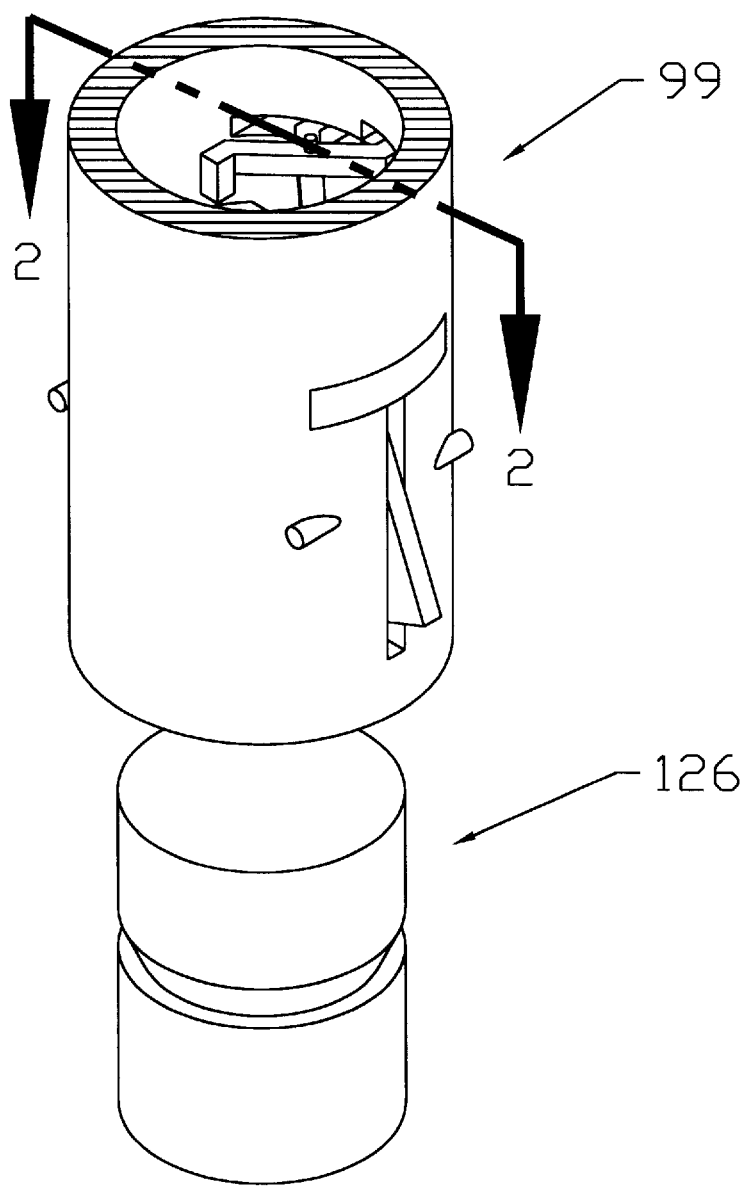
FIG. 1 shows a full isometric view of the lever latch invention in the unlocked position.
Figure 2:
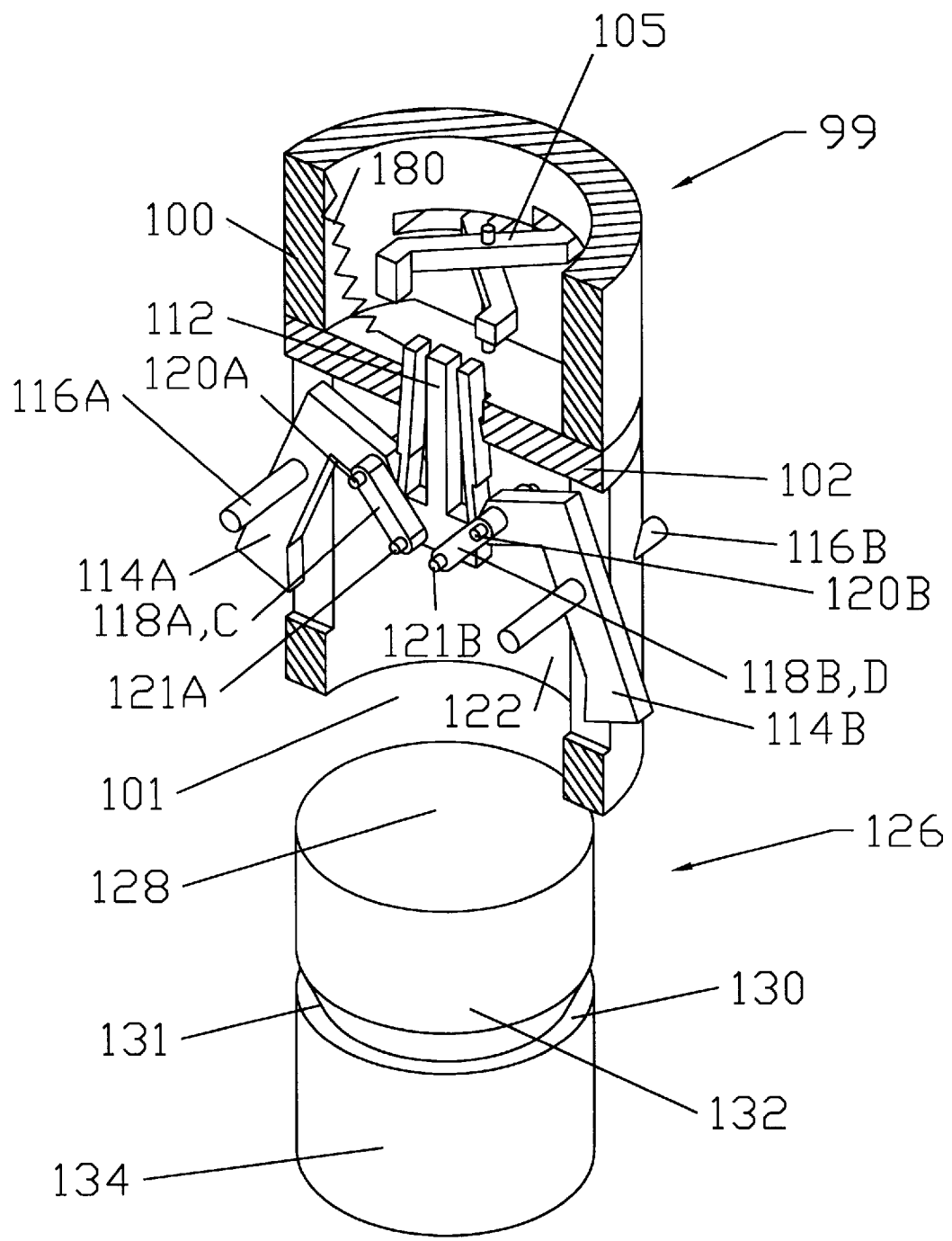
FIG. 2 is an isometric cutaway view of the lever latch invention in the unlocked position showing the internal configuration of components.

The main parts to lever latch 99 include a thick walled housing unit 100, a pair of pivotally mounted clamping levers 114, a displaceable catch referred to as diaphragm 112, a stationary catch 102, and a release assembly 105. FIG. 2 shows a cutaway view of the lever latch assembly with internal configuration of components.

Figure 5:
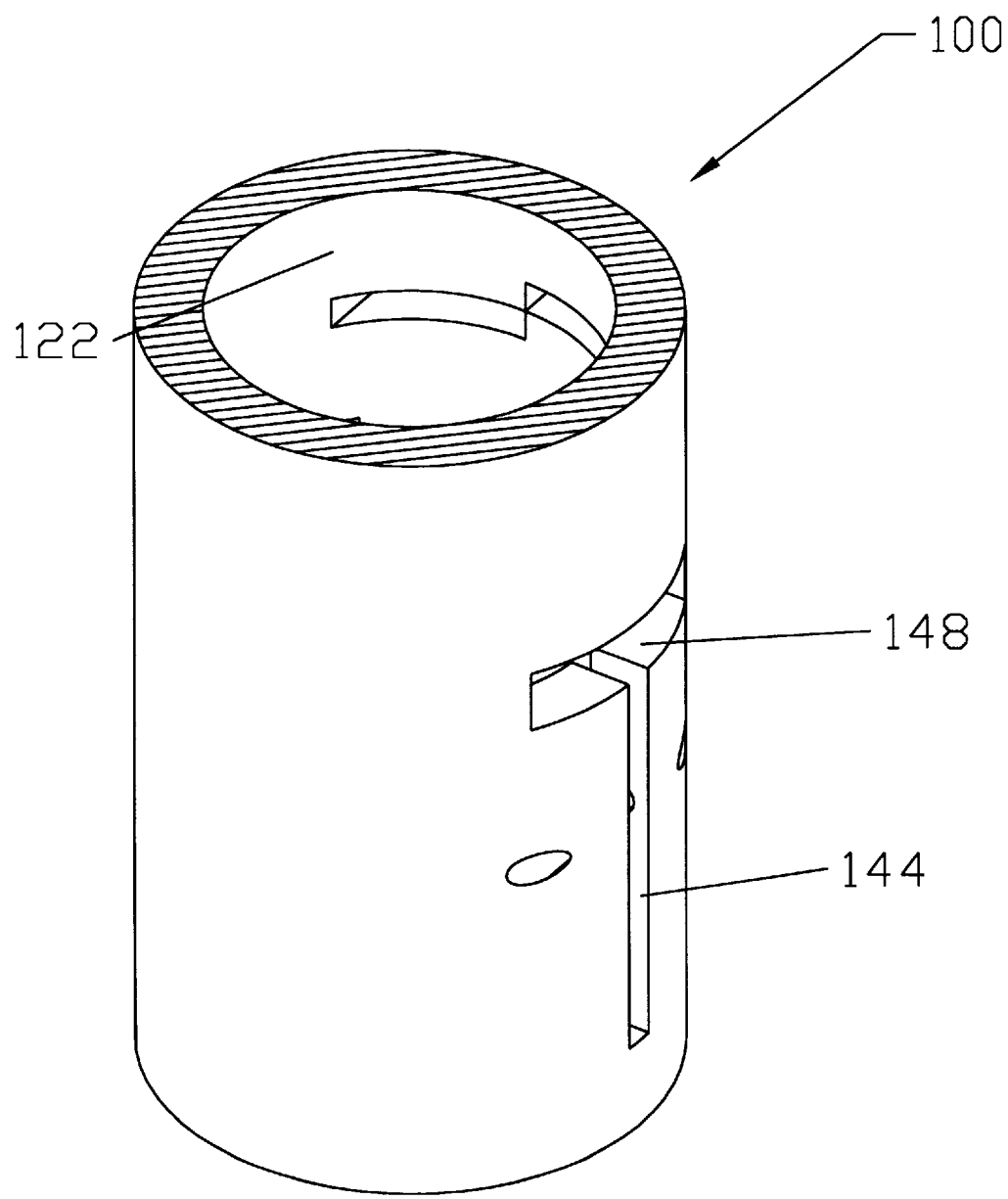
FIG. 5 shows a separate isometric view of the lever latch housing unit.

Housing member 100 comprises the main structure of lever latch 99. FIG. 5 shows an isometric view of housing member 100 alone without any other components. Bore hole 101 is a region where the external beam 126 is inserted into the lever latch assembly. Cavity 144 is a opening within housing member 100 for each lever 114 to reside in. Cavity 148 is a slot opening through housing member 100 to support stationary catch 102.

Figure 6:
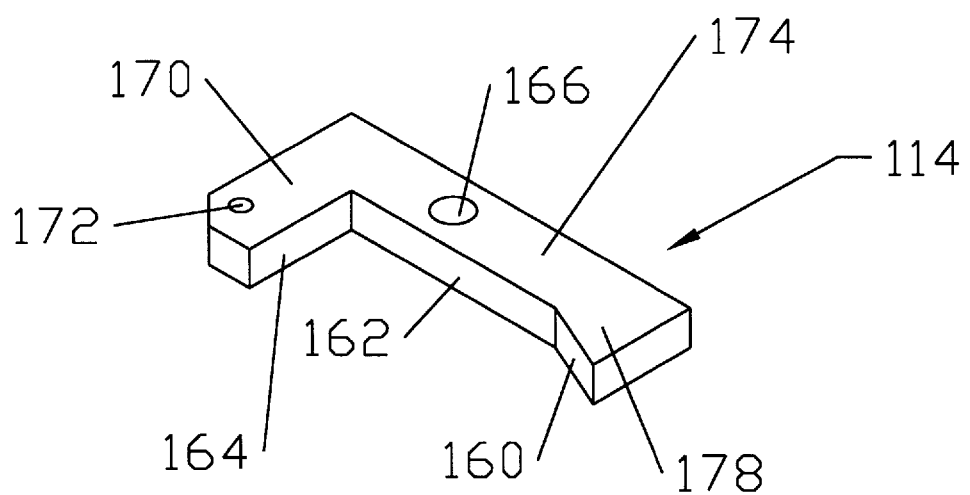
FIG. 6 shows a separate isometric view of a clamping lever associated with the lever latch.
Figure 7:
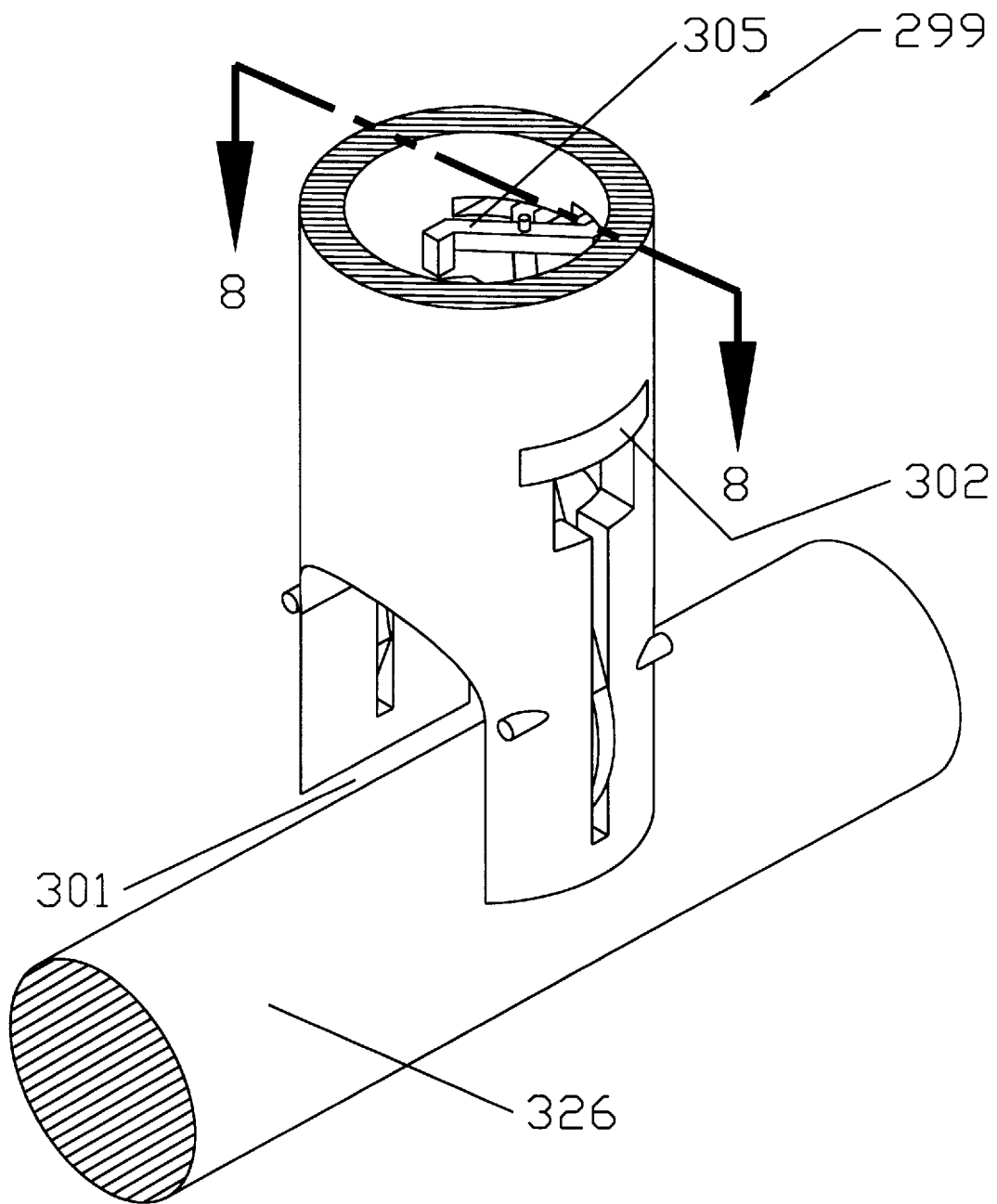
FIG. 7 shows a full isometric view of the lever clamp invention in the unlocked position.

Lever 114 is pivotally mounted within the housing member by support 116. Hole 166 is the corresponding lever support hole. Hole 172 is a link support hole. The profile of lever 114 shown in FIG. 6 is formed by rectangular regions 170, 174, and triangular notch 178. Surface 162 runs parallel to the axis of lever latch 99 and is aligned with inside diameter 122 of housing unit bore hole 101. Surface 164 defines the upper lip that first engages the end surface 128 of the external beam. Diaphragm 112 is spring loaded by spring 180 to keep the clamping levers in the open position (FIG. 2).

Figure 3:
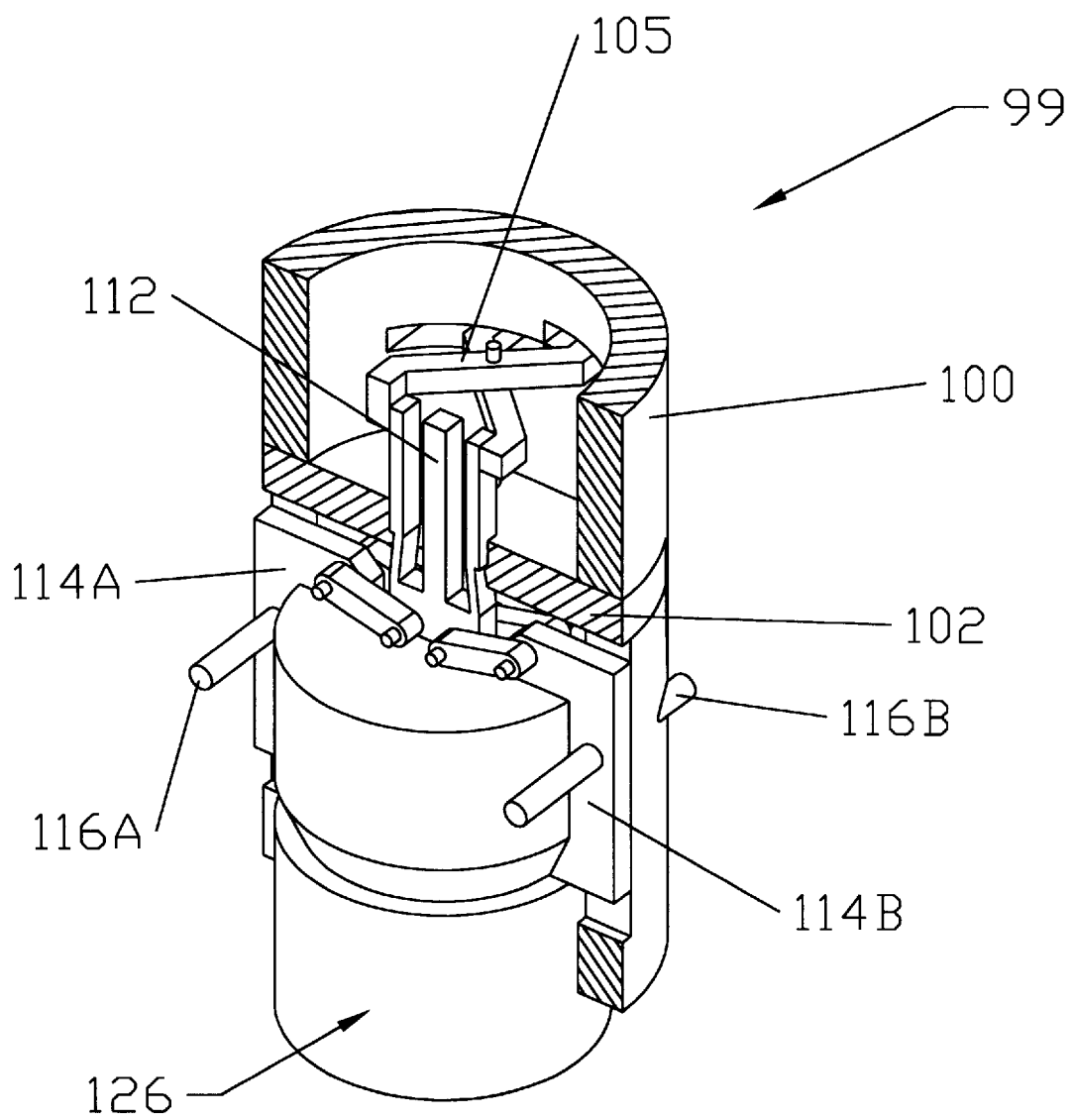
FIG. 3 shows an isometric cutaway view of the lever latch invention in the locked position with external beam fully inserted into the housing element.

The profile of each lever 114 matches the profile of external beam 126. As shown in FIG. 3, levers 114 clasp around the profile of the external beam when the external beam is fully inserted into the lever latch assembly. Surface 160 is inclined at an angle greater than or equal to 45 degrees but less then 90 degrees with respect to surface 162. Surface 160 angles into the external beam to form a restraining protrusion preventing the external beam from being pulled out of the latch assembly.

Referring to FIG. 2, four links 118*a*, 118*b*, 118*c*, and 118*d* connect levers 114*a* and 114*b* to diaphragm 112. These four links are used to impart angular momentum to the clamping levers and help retain plan motion when the clamping levers rotate. Diaphragm 112 is connected to the four links by pins 121*a* and 121*b*. Pins 120*a* and 120*b* connect levers 114 to links 118.

Diaphragm 112 is a displaceable catch whose function is to lock with the stationary catch when the external beam is fully inserted into the latch assembly. The features of the diaphragm include a solid body, a lock mechanism, guide supports, and connection points for linkages. Every displaceable lock will have these same features, although they will be designed differently. This design configuration was chosen as part of the main embodiment for sake of simplicity. Other more complex designs may accomplish the same locking action.

Support 116 and stationary catch 102 are fixed in position by the same housing member 100. The function of the stationary catch is to lock with the diaphragm when the external beam is fully inserted into the lever latch. The features of the stationary lock include a solid body for mounting within the latch, and a lock mechanism that is compatible with the diaphragms lock mechanism.

Like the diaphragm, release mechanism 105 was chosen for simplicity. Other more complex designs may be used to accomplish the same release action. The release mechanisms function is to release the structural lock between the diaphragm and the stationary lock.

External beam 126 is shown in FIG. 2. External beam 126 posses a notch 130 around the beams perimeter, an end surface 128, a perimeter surface 132 between end surface 128 and notch 130, and a main assembly section 134. The external beam represents support structure and is mechanically connected to other equipment or support assembly as shown in FIG. 20. An inclined surface 131 helps form notch 130. The profile of circular notch 130 around the perimeter of beam 126 matches the profile for triangular protrusion 178 of lever 114.

Operation of Lever Latch—FIGS. 4A to 4E

The manner of using the lever latch to connect two separate beams together is similar to snap together latches in use today. FIGS. 4a through 4e portray the locking sequence of events. Five cutaway side views of the lever latch at different phases of the locking action are shown. The overall objective is to insert end 132 of beam 126 into bore hole 101 of the lever latch. This action as explained below results in both beam and lever latch being physically restrained from movement relative to each other. The beam is now said to be mechanical joined with respect to the lever latch.

Figure 4E:
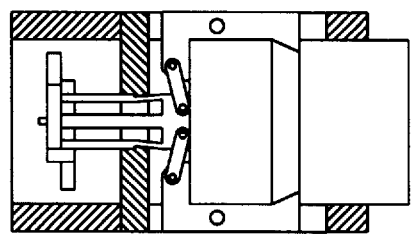
FIGS. 4A–4E show a series of lever latch plan views portraying the joints locking sequence.
Figure 4D:
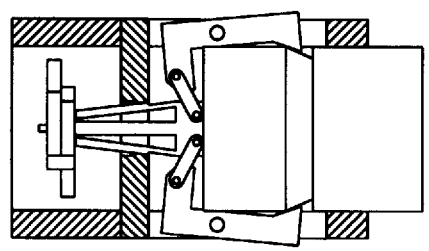
Figure 4C:
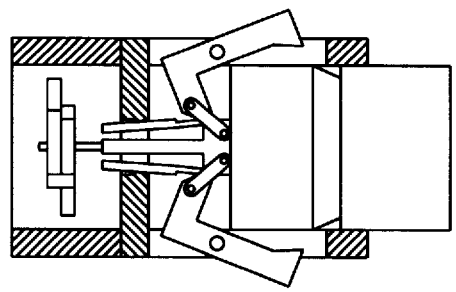
Figure 4B:
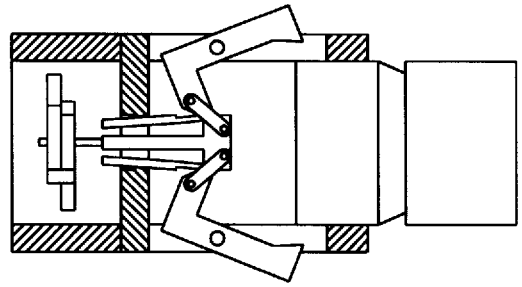
Figure 4A:
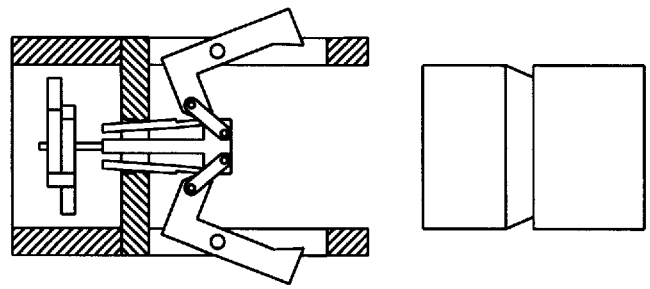

FIG. 4a shows the lever latch in a position to accept insertion of the external beam. FIG. 4b shows a partial insertion of the beam into the bore hole. Note that no movement of the diaphragm or clasping levers has occurred. FIG. 4c shows the top of the external beam, surface 128, just impacting the base of the diaphragm. Still no movement of the diaphragm or locking levers has occurred to this instant.

Continuing to push the beam into cavity 101 from this point forward now forces the diaphragm towards a mating locked configuration with the stationary catch. As the diaphragm is moved, the linkage assembly forces each lever to rotate clockwise about their respective supports 116 in plane motion.

Displacement of diaphragm 112 from the point shown in FIG. 4c onward results in triangular section 178 of lever 114 being inserted into cavity 130 on beam 126. This insertion process is smooth due to inclined surface 131. The profile of each clamping lever is brought closer into full contact with the profile of the external beam. FIG. 4d portrays the diaphragm and clasping levers at a midway location of the insertion process.

FIG. 4e shows the external beam fully inserted into the bore hole. The diaphragm is locked with the stationary catch. The clasping lever profiles match the profile of the top portion of the external beam. This means that triangular region 178 is fully inserted into cavity 130, and inclined surface 160 on each clasping lever is aligned with inclined surface 131 of external beam 126. No further motion of the clamping levers, links, or diaphragm may occur.

External beam 126 is now mechanically connected to lever latch 99. A mechanical connection means the beam will not move linearly or rotate with respect to the lever latch assembly. Depending on the tolerances of the lever latch components, there may be some minor shifting of components relative to each other, but no large scale displacements.

Two criteria are met to provide this mechanical connection. First the stationary catch, diaphragm, link, and clamping levers restrain the beam from linear movement. Secondly, a large surface area contact between the external beam and inner circumference of the housing member bore hole prevents either unit from rotating with respect to each other. These two criteria are achieved the instant the diaphragm is locked with the stationary catch, which coincides with the external beam fully inserted into the lever latch assembly.

To disengage beam 126 from lever latch 99, the user engages release assembly 105. This action releases the diaphragm from the stationary lock and allows the diaphragm to displace toward the bore hole. This motion of diaphragm 112 disengages clamping levers 114 from the external beam. External beam 126 is now free to slide out of bore hole 101. Note that no external tools were required to lock or unlock the beam.

Description of Lever Clamp—FIGS. 9 to 16

FIG. 8 is an isometric cutaway view of the main assembly showing the internal configuration of parts of my lever clamp invention 299. The main components of lever clamp 299 include a thick walled housing member 300, a pair of pivotally mounted clamping levers 314, a displaceable catch referred to as a diaphragm 312, a stationary catch 302, and a release assembly 305.

Housing member 300 comprises the main structure of lever clamp 299. FIG. 11 shows an isometric view of housing unit 300 without any other components. Recesses 303 are cut into the housing walls on opposite sides of bore hole 301 and are dimensioned to match the cross sectional profile of the external beam. The external beam is inserted cross-wise into these recesses where clamping levers 314 may clasp around the beam. Cavity 344 is an opening within housing unit 300 for each lever 314 to reside in. Cavity 348 is an opening in housing member 300 to support stationary catch 302. Cavity 349 is also cut out to provide space for the supports that connect link to levers.

Lever 314 is pivotally mounted by support 316. Hole 366 is the corresponding lever support hole. Hole 372 is a link support hole. The profile of each clamping lever 314, as shown in FIG. 12, is formed by angled surface 360, arcing surface 362, and straight surface 364.

As shown in FIG. 9, levers 314 clasp around the profile of the external beam when the external beam is fully inserted into the wall recesses of the lever clamp assembly. The arc contour of surface 360 matches the contour of inserted beam 326. Surface 360 is angled to avoid interference with diaphragm 302 when rotation occurs. Hole 372 is located to provide the correct angular rotation rate of lever 314 for clasping to occur. Diaphragm 312 is spring loaded by spring 380 to keep the clamping levers in the open position (FIG. 8).

Referring to FIG. 8, four links 318a, 318b, 318c, and 318d connect levers 314a and 314b to diaphragm 312. These four links are used to impart angular momentum to the clamping levers and help retain plan motion when the clamping levers rotate. Diaphragm 312 is connected to the four links by supports 321a and 321b. Pins 320a and 320b connect levers 314 to links 318.

Diaphragm 312 is a displaceable catch whose function is to lock with the stationary catch when the external beam is fully inserted within the wall recesses of the lever clamp assembly.

Support 316 and stationary catch 302 are fixed in position by the same housing member 300. The function of the stationary catch is to lock with the diaphragm when the external beam is fully inserted into the wall recesses of the lever clamp assembly. The release mechanisms function is to release the diaphragm from the stationary catch when engaged by the user.

External beam 326 that is inserted into lever clamp 299 is shown in FIG. 8. Beam 326 represents support structure and is connected to other equipment or support assembly as shown in FIG. 19. The profile of circular arc 362 for clasping lever 314 matches the cross sectional contour of external beam 326. The lever clamp may then attach at any angle along any portion of the external beam.

Operation of Lever Clamp—FIGS. 12A to 12E

The manner of using the lever clamp to connect two separate beams together is similar to the operation of the lever latch. FIGS. 10a through 10e portray the locking sequence of events. Five cutaway side views of the lever clamp at different phases of the locking action are shown. The overall objective is to insert the end of beam 326 into the wall recesses of the lever clamp assembly. This action results in the diaphragm being pushed into a locked position. Vie the system of links described above for lever clamp 299, two clamping levers are moved into a position to clasp around the inserted beam, thus forming the mechanical integrity necessary to restrict the inserted beams movement. Both beam and latch are physically restrained from linear and rotational movement relative to each other. The external beam is now said to be mechanically joined with the lever clamp.

Disengagement of external beam 326 from lever clamp 299 is accomplished by the user engaging release assembly 305. This action releases the diaphragm from the stationary catch and allows the diaphragm to displace toward the bore hole. Displacement of diaphragm 312 disengages the clasping levers from external beam 326. External beam 326 is now free to slide out of wall recesses 303. Note that no external tools were required to lock or unlock the beam.

Description of Trunnion Clamp—FIGS. 13 to 19

FIG. 14 is an isometric partial cutaway view of the main assembly showing the internal configuration of components. The main parts of trunnion clamp 499 include a flat plat style housing member 500, a pair of pivotally mounted clamping levers 514, a displaceable catch referred to as a diaphragm 512, a stationary catch 502, and a release assembly 505.

Housing member 500 comprises the main structure of the trunnion clamp 499. FIG. 18 shows an isometric view of housing member 500 alone without any other components. A base plat 503 provides the foundation for all housing components. An interior cavity is formed by walls 542 and 544. A cover plate 510 rests on top of all side walls. The thickness of these walls and the cover plate must be great enough to support bending and shear stresses due to structural loads imparted by the external beam. Bolts 507 connect the housing unit to a solid surface.

Lever 514 is pivotally mounted by support 516. An isometric view of clamping lever 514 is shown in FIG. 19. Lever 514 consists of a circular tab 578 that forms a rectangular stepped cross section used for clamping, two recessed cavities 576 on opposite sides, and a main body 570. An upper curved surface 562 and lower curved surface 564 form the stepped cross section. Hole 566 is the lever support hole. Hole 572 is a link support hole. The two recessed cavities provide space for the links to connect to the clasping lever. Diaphragm 512 and levers 514 are spring loaded by spring 580 to keep the clamping levers in the open position (FIG. 14).

Referring to FIG. 15, four links 518 connects lever 514 to diaphragm 512. Links 518 help retain plan motion of lever 514. Diaphragm 512 is connected to links 518 by supports 521.

Diaphragm 512 is a displaceable catch whose function is to move upon contact with the external beam and to lock with the stationary catch when the external beam is fully inserted into bore hole cavity 501 of the trunnion clamp assembly. The release mechanisms function is to release the diaphragm from the stationary catch when engaged by the user.

External beam 526 is shown in FIG. 14. The external beam posses two flat pancake style disks. Disk 536 is at the extreme end, while disk 538 is offset from the end a small distance.

As shown in FIG. 17, disk 536 fits under the stepped cross section of the clamping levers. The second disk 538 slides on top of the top plate to provide moment support. This configuration restrains the external beam from being simultaneously pulled perpendicularly and axially out of the trunnion clamp assembly. If the external beam is a stud protruding from a flat surface, disk 538 is not needed since the flat surface acts as the moment restraint.

Operation of Trunnion Clamp—FIGS. 16A to 16E

The manner of using the trunnion clamp to connect two separate beams together is similar to the operation of the lever latch and lever clamp. FIGS. 16a through 16e portray the locking sequence of events. Five cutaway top views of the trunnion clamp at different phases of the locking action are shown. Disk 538 is not shown for clarity. The overall objective is to insert external beam 526 with extended disk 536 into bore hole 501 of the trunnion clamp. Disk 538 slides on top of the cover plate. This action results in the diaphragm being pushed into a locked position. Vie the system of links described above for trunnion clamp 499, two clamping levers are moved into a position to clasp around the inserted beam. The mechanical integrity is thus formed to restrict the beams movement. Both beam and latch are physically restrained from linear and rotational movement relative to each other. The beam is now said to be mechanically joined with the trunnion clamp.

Disengagement of external beam 526 from trunnion clamp 499 is accomplished by the user engaging release assembly 505. External beam 526 is now free to slide out of bore hole 501. Note that no external tools were required to lock or unlock the beam.

Summary, Ramifications, and Scope

Accordingly, the reader will see that mechanical joints using pivotally mounted clasping levers linked to a displaceable catch provides a one step connect and disconnect action, can be adapted for use in several different structural support designs, and provides a self actuating joining action. These support members require no user adjustment or alignments to function, making them ideal for use in remote locations, physically confined spaces, or in adverse environmental conditions. The mechanical joints presented in this patent have the following additional advantages:

(a) they reduce the physical volume required of the entire support assembly;

(b) they require no integration with system components to function;

(c) they make automated assembly and remote handling easier to perform;

(d) they require no tools to help provide the locking action;

(e) they simultaneously support combined stress loads of shear and moment loads;

(f) they reduce the amount of mass and volume of materials delivered to the operational site by allowing the user to vary the structures erected on-site according to their operational needs;

(g) they make assembly and disassembly of structures time efficient;

(h) they may be manufactured by machining or directly out of molds.

(i) they may be designed separately as a single joint or multiple joint design with similar connections, or as a mix of connection joints to form a multiple joint design with different connections.

Additional Ramifications

Although the descriptions for the three support members above contain many specifications, these should not be construed as limiting the scope of the invention but as merely providing illustrations of some of the presently preferred embodiments of this invention. For example, the cross section of external beams and housing units of each mechanical joint presented in this patent may vary from circular, rectangular, or triangular cross section; plan motion of the levers may be occur in any orientation within the mechanical joint and may also be different from the orientation of the diaphragm; the number of links between diaphragm and clasping levers may be varied and may be omitted if designed properly; the number of clamping levers may be varied from one to over three levers; a second or third catch may be used to lock the diaphragm in place; quick release levers may be omitted; the diaphragm may be motor driven; the components of the mechanical joint assembly may be designed according to an engineering code, thus allowing scaling of components to match different loading conditions; the diaphragm may be locked in several different ways with the stationary catch; and the release assembly may have several design possibilities.

An example of a rectangular cross section for the lever latch is shown in FIG. 21. Operations that require a rectangular versus a round beam may thus also use the new joint technology presented in this patent. Still further design versatility is shown in FIG. 22 with an example of how the lever latch, lever clamp, and trunnion clamp designs may be combined to form a mechanical joint assembly.

Thus the scope of the invention should be determined by the appended claims and their legal equivalents, rather than by the examples given.

I claim:

1. A mechanical joint comprising:

(a) a housing member comprising a plurality of side surfaces uniform or non-uniform in size, a plurality of openings on one side of said housing member, and a central hollow cavity that intercepts said openings, (b) a plurality of clamping lever members each comprising jaw profile clasping surfaces formed by a predetermined engager extension at one end, a tapered restraining protrusion on the opposite end of said clamping lever extending in the same direction as said engager extension, and a support hole within the central body of said levers, (c) a plurality of external rigid elements with the same dimensional cross section as said openings, comprising clasping profiles formed by an indented notch circumventing or partially circumventing around each said rigid element and having an indention matching the protruding clasping profiles of said clamping levers, and mechanically joined to a first external structural unit, (d) with means for said clamping levers to be pivotally supported by said housing member and free to pivot in any plane motion orientation within said housing member, (e) with means for said clamping levers to be rigidly joined or locked to said housing member when said first external elements are fully inserted axially into said bore holes of said housing member and all said clasping surfaces of said first external elements abut against said clasping surfaces of said clamping levers so that said external elements are fully constrained from moving relative to said housing member, (f) with means for said housing member to be mechanically joined to a second external structural unit, (g) with means for said clamping levers to be spring loaded, tending to keep said assembly in an open position ready to receive said first external elements.

2. The housing and levers of claim 1 wherein recesses are cut into the housing walls on opposite sides of said housing member and dimensioned to match the outer profile of said first external elements as said external elements are inserted cross-wise into said recesses of said housing member, and wherein profiles of said levers are dimensioned to match the outer profile of said first external elements allowing said clasping surfaces of said clamping levers to abut against said outer profile of said external elements.

3. The housing of claim 1 wherein said housing unit is a flat box housing unit comprising a plurality of openings that extend from current said openings and cut into one base side of said housing member, forming the top side of said housing member, and are dimensioned to match said outer profile of said first external elements wherein said external elements extend perpendicularly from said top surface of said housing member when fully inserted sideways into said housing member.

4. The clamping levers and external elements of claim 3 wherein said clasping surfaces of said clamping levers are stepped in cross section with the stepped protrusion located away from the housing units bottom wall, forming a plurality of clasping surfaces that are collinearly spaced from each other, and said external elements have symmetrically mating clasping profiles formed by a plurality of flat disks protruding from said external elements, with each said flat disk residing underneath their respective clamping protrusion.

5. The clamping levers and external elements of claim 4 wherein said clasping surfaces of said clamping levers are angled in cross section resulting in a tapered protrusion with the tapered end located away from the housing unit bottom wall, forming a plurality of clasping surfaces that are collinearly spaced from each other, and said external elements have symmetrically mating clasping profiles formed by a plurality of flat disks protruding from said external elements, with the resulting tapered portion of each said flat disk residing underneath their respective mating protrusion.

* * * * *